United States Patent
Wang et al.

(10) Patent No.: US 10,367,195 B2
(45) Date of Patent: Jul. 30, 2019

(54) ELECTRO-ACTIVE MATERIAL OF A CATHODE OF PRIMARY BATTERY

(71) Applicant: Renata AG, Itingen (CH)

(72) Inventors: Xiaojun Wang, Olten (CH); Pascal Haering, Muttenz (CH)

(73) Assignee: Renata AG, Itingen (CH)

( * ) Notice: Subject to any disclaimer, the term of this patent is extended or adjusted under 35 U.S.C. 154(b) by 196 days.

(21) Appl. No.: 15/298,741

(22) Filed: Oct. 20, 2016

(65) Prior Publication Data

US 2017/0125798 A1   May 4, 2017

(30) Foreign Application Priority Data

Oct. 28, 2015 (EP) .................................. 15191900

(51) Int. Cl.
*H01M 4/02* (2006.01)
*H01M 4/06* (2006.01)
(Continued)

(52) U.S. Cl.
CPC ............ *H01M 4/364* (2013.01); *C01G 31/00* (2013.01); *C01G 45/1221* (2013.01);
(Continued)

(58) Field of Classification Search
CPC ........ H01M 4/364; H01M 4/06; H01M 4/485; H01M 4/505; H01M 6/14; H01M 4/382;
(Continued)

(56) References Cited

U.S. PATENT DOCUMENTS

| 8,524,397 | B1 | 9/2013 | Yumoto et al. |
| 2003/0186117 | A1* | 10/2003 | Shokoohi ............ H01M 2/021 429/162 |

(Continued)

FOREIGN PATENT DOCUMENTS

| EP | 2 445 049 A1 | 4/2012 |
| EP | 2 634 845 A1 | 9/2013 |

OTHER PUBLICATIONS

European Search Report dated Apr. 26, 2016 in European Application 15191900.8 filed on Oct. 28, 2015 (with Written Opinion).

(Continued)

*Primary Examiner* — Gregg Cantelmo
(74) *Attorney, Agent, or Firm* — Oblon, McClelland, Maier & Neustadt, L.L.P.

(57) ABSTRACT

An electro-active material, including a mixture of a first component including at least a first compound of formula (I) $Li_xMnO_y$, and a second component including at least a second compound of formula (II) $Li_xH_yV_3O_8$, wherein in formula (I): $0 \leq x \leq 2$, $1 \leq y \leq 3$, and $2 \leq 2y-x \leq 5$, and wherein in formula (II): $0 \leq x \leq 4.5$, $0.01 \leq y \leq 2$, and $0.01 \leq x+y \leq 6.5$. The first compound is in the form of particles having a certain particle size and the second compound is in the form of nanoparticles having a certain particle size or nanofibers having certain dimensions. The first and second components are present in amounts of 1:99% to 99:1% by weight, and the mixture, upon being mechanically pressed in a range of 20 to 70 KN with a die, has a synergic effect of pressed density (SEPD) greater than 100%.

19 Claims, 1 Drawing Sheet

(51) Int. Cl.
*H01M 4/36* (2006.01)
*H01M 4/38* (2006.01)
*H01M 6/14* (2006.01)
*H01M 6/16* (2006.01)
*C01G 31/00* (2006.01)
*C01G 45/12* (2006.01)
*H01M 4/485* (2010.01)
*H01M 4/505* (2010.01)

(52) U.S. Cl.
CPC .............. *H01M 4/06* (2013.01); *H01M 4/485* (2013.01); *H01M 4/505* (2013.01); *H01M 6/14* (2013.01); *C01P 2004/16* (2013.01); *C01P 2004/61* (2013.01); *C01P 2004/62* (2013.01); *C01P 2004/64* (2013.01); *C01P 2004/80* (2013.01); *H01M 4/382* (2013.01); *H01M 6/16* (2013.01); *H01M 2004/028* (2013.01); *H01M 2220/30* (2013.01)

(58) Field of Classification Search
CPC .............. H01M 6/16; H01M 2004/028; H01M 2220/30; C01G 45/1221; C01G 31/00; C01P 2004/16; C01P 2004/61; C01P 2004/62; C01P 2004/64; C01P 2004/80
See application file for complete search history.

(56) References Cited

U.S. PATENT DOCUMENTS

| | | | |
|---|---|---|---|
| 2007/0065728 A1* | 3/2007 | Zhang | H01M 4/134 429/326 |
| 2012/0100402 A1* | 4/2012 | Nesper | H01M 4/131 429/48 |
| 2013/0157138 A1* | 6/2013 | Mettan | 429/231.5 |
| 2013/0216903 A1 | 8/2013 | Pitteloud | |
| 2014/0127562 A1 | 5/2014 | Nesper et al. | |

OTHER PUBLICATIONS

V. Legagneur, et al. "Lithium insertion/deinsertion properties of new layered vanadium oxides obtained by oxidation of the precursor $H_2V_3O_8$", Electrochimica Acta, Elsevier Science Publishers, Barking, GB, vol. 47, No. 7, 2002, 9 pages.

* cited by examiner

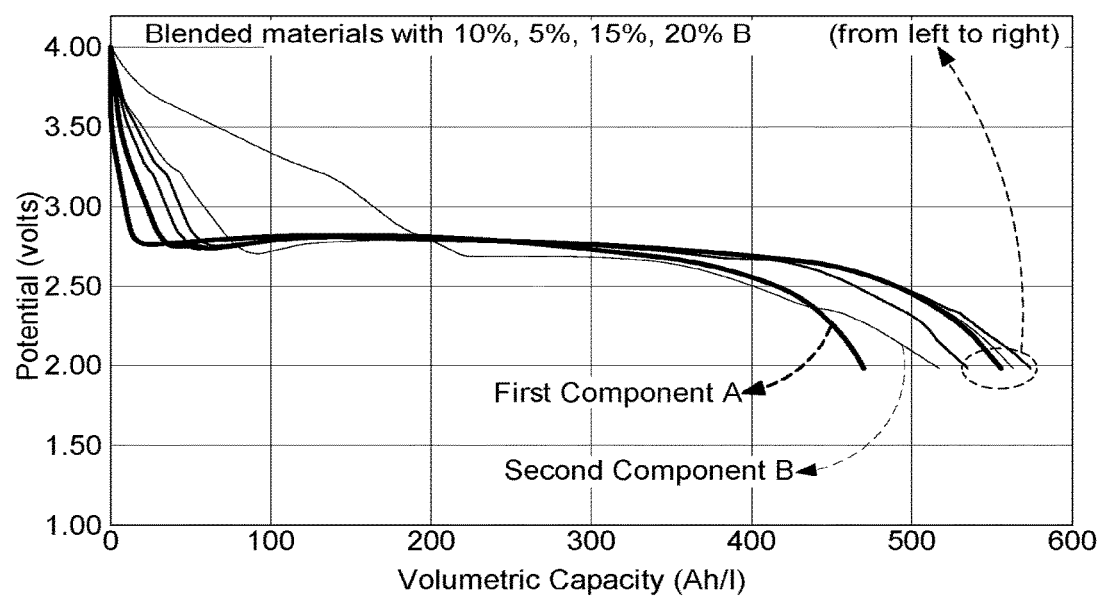

ELECTRO-ACTIVE MATERIAL OF A CATHODE OF PRIMARY BATTERY

This application claims priority from European Patent Application No 15191900.8 of Oct. 28, 2015, the entire disclosure of which is hereby incorporated herein by reference.

FIELD OF THE INVENTION

This invention relates to an electronically or electrochemically active material (EAM), a cathode comprising same, and a primary battery comprising such cathode.

BACKGROUND OF THE INVENTION

Since 1973 the first primary lithium battery was commercialized by Sony. These electrochemical cells have been applied widely as the power supply in a variety of electronic devices for decades. The developing functions of these devices always need the batteries with higher energy density. On the other hand, to decrease the pollution and greenhouse gas emissions is becoming urgent nowadays and driving the demand of new batteries with better performance as well.

The lithium electrochemical cell consists of three fundamental components, anode, electrolyte and cathode. Lithium metal or Li contained alloy, graphite-like materials, metal oxide, sulphide, nitride, etc., that have low reduction potential can be used as active anode materials. Generally lithium salt dissolving in no aqueous system is used as electrolyte. Cathodes are the compounds that can take the lithium ions into the structure along with electrochemical reaction and meanwhile produce energy. The chemical potential and specific capacity of anode and cathode decide the energy density of the battery.

Manganese oxide ($MnO_2$) has been used as active cathode material in dry-batteries for a long time. Until now it is still playing an important role in the commercial primary lithium batteries due to the good performance, sufficient resource and economic price. $MnO_2$ has various kinds, including natural ore, e.g. pyrolusite, ramsdellite, nsutite (is called as NMD), prepared compound by chemical process (CMD) and by electrolytic process (EMD). EMD $MnO_2$ is very common industrial used raw chemical that can be further treated and applied as the active cathode material in batteries. The crystal structure of EMD is called $\gamma$-$MnO_2$, and it is treated with different temperature to form $\beta$-$MnO_2$ phase or $\beta$-$\gamma$-$MnO_2$ mixed phase, which can be optimized as promising cathode material in primary Li batteries. The other phases of cathode $MnO_2$ include $\alpha$-$MnO_2$, $\delta$-$MnO_2$, $\epsilon$-$MnO_2$, and $\lambda$-$MnO_2$. Amorphous, mixed phases, lithiated and modified phases can also be applied as active cathode materials in Li batteries. A lot of patents have contributed to the different produce processes that can improve the electrochemical performance of $MnO_2$ related cathodes, such as U.S. Pat. Nos. 4,297,231, 5,698,176 and 6,403,257.

Vanadium oxides have been investigated as battery materials for decades due to its high oxidation state (5+) and capability to be reduced to lower oxidation state (4+, 3+), which is expected to produce high energy density. They may be used as active cathode in Li battery. A lot of efforts have been carried on in the studies of different types of vanadium oxides such as $V_2O_5$, $LiV_3O_8$, $(Li_{1.3-y}Cu_y)V_3O_8$, $VO_2$, $V_6O_{13}$ and $Li_3V_6O_{13}$.

To use blended materials as active materials was proposed in several patents such as blended cathodes of $Ag_2CrO_4$ and $Ag_3PO_4$ (U.S. Pat. No. 3,981,748), lithium cobaltate and manganate spinel for secondary batteries (U.S. Pat. Nos. 7,811,707, 7,811,708). Mixtures of $MnO_2$ and $CF_x$ can be also used as promising active cathode materials in primary lithium batteries (US 2009/0081545). In JP 2575993 and US 2007/0072081, $V_2O_5$ and $LiV_2O_5$ were used as one component of mixture cathode materials in secondary batteries. In US publication 2013/0216903, the synergetic effect of specific capacity in secondary batteries was found in blended $Li_xH_yV_3O_8$ and $LiFePO_4$, but not in the system of $Li_xH_yV_3O_8$ and $LiCoO_2$.

The drawbacks of the known electro-active materials for primary batteries are their lack of specific capacity and of energy density.

It is therefore necessary to propose a new electro-active material for primary batteries with higher specific capacity and energy density.

It is also necessary to propose a new electro-active material for primary batteries with high energy density which allows to be produced by an economic method and by using materials with sufficient resource.

SUMMARY OF THE INVENTION

To this end, the present invention relates to an electro-active material of a cathode of primary lithium batteries comprising a mixture of a first component comprising at least a first compound of formula (I) $Li_xMnO_y$, and a second component comprising at least a second compound of formula (II) $Li_xH_yV_3O_8$, wherein in formula (I):

$0 \leq x \leq 2$ $0 \leq y \leq 4$ $0 \leq 2y-x \leq 7$, wherein in formula (II):

$0 \leq x \leq 4.5$ $0.01 \leq y \leq 2$ $0.01 \leq x+y \leq 6.5$ wherein the first compound is in the form of particles having a particle size comprised between 1 μm and 200 μm, preferably between 10 μm and 100 μm, and the second compound is in the form of nanoparticles having a particle size less than 500 nm, preferably comprised between 10 nm and 500 nm, and more preferably comprised between 20 nm and 100 nm, or in the form of nanofibers with a length comprised between 0.2 μm and 500 μm, preferably comprised between 100 μm and 300 μm, and a width comprised between 10 nm and 200 nm, preferably between 20 nm and 100 nm, and said first component and said second component are present in amounts of 1:99% by weight to 99:1% by weight.

The present invention relates also to a method for preparing an electro-active material of a cathode of primary lithium batteries as defined above, said method comprising a step of preparing a first component comprising at least a first compound of formula (I) $Li_xMnO_y$, a step of preparing a second component comprising at least a second compound of formula (II) $Li_xH_yV_3O_8$, and a step of mixing said first and second components.

The present invention relates also to a cathode comprising the electro-active material as defined above.

The present invention relates also to a primary lithium battery comprising:

(a) a cathode comprising an electro-active material as defined above,
(b) an anode, and
(c) a non-aqueous electrolyte between said electrodes.

The electro-active material of the invention comprising a blend of manganese oxide and vanadium oxide compounds allows to obtain a cathode having enhanced volumetric capacity and energy density compared to the single compounds. Moreover it can be produced by an implementable and economic method. Primary lithium batteries comprising such cathode have improved capacity and energy density.

BRIEF DESCRIPTION OF THE DRAWINGS

The aims, advantages and features of the present invention will appear more clearly in the following detailed description of at least one embodiment of the invention, given solely by way of example, in a non-limiting manner and illustrated by the annexed drawings in which:

FIG. 1 shows volumetric capacity vs. potential (the first discharge to 2 V) profiles of the cathodes with different ratios of first component A based on $MnO_2$ and second component B based on $Li_xH_yV_3O_8$ (Mn/V). The trend lines are polynomial fitting. (Current: 0.1 mA/cm2).

DETAILED DESCRIPTION OF THE INVENTION

According to the present invention, the electro-active material (EAM) of a cathode of primary lithium batteries comprises a mixture or blend of a first component comprising at least a first compound of formula (I) $Li_xMnO_y$, and a second component comprising at least a second compound of formula (II) $Li_xH_yV_3O_8$,
wherein in formula (I):

$0 \leq x \leq 2$ $0 \leq y \leq 4$ $0 \leq 2y-x \leq 7$, wherein in formula (II):

$0 \leq x \leq 4.5$ $0.01 \leq y \leq 2$ $0.01 \leq x+y \leq 6.5$.

Thus, the present invention provides mixtures or "blends" of electro-active materials. The terms "mixture" or "blend" mean that they comprise at least two components comprising particles of EAM having respectively different chemical compositions, i.e. particles of two groups of chemical compounds, namely compounds of formula (I) and compounds of formula (II).

It has surprisingly be found that such compositions exhibit a positive synergistic, i.e. capacity enhancing effect allowing the production of batteries with higher energy density. The batteries of the invention have a volumetric capacity higher than 520 Ah/l (first discharge to 2V), and preferably higher than 535 Ah/l.

Preferably, in formula (I):

$0 \leq x \leq 2$ $1 \leq y \leq 3$ $2 < 2y-x < 5$

More preferably, in formula (I), x is about 0 and y is about 2, so that the first compound is $MnO_2$. $MnO_2$ has various kinds, including natural ore, e.g. pyrolusite, ramsdellite, nsutite (is called as NMD), prepared compound by chemical process (CMD) and by electrolytic process (EMD). EMD $MnO_2$ is very common industrial used raw chemical that can be further treated and applied as the active cathode material in batteries. The crystal structure of EMD is called $\gamma$-$MnO_2$, and it is treated with different temperature to form $\beta$-$MnO_2$ phase or $\beta$-$\gamma$-$MnO_2$ mixed phase, which can be optimized. The other phases of cathode $MnO_2$ include $\alpha$-$MnO_2$, $\delta$-$MnO_2$, $\varepsilon$-$MnO_2$, and $\lambda$-$MnO_2$. Amorphous, mixed phases, lithiated phases according to formula (I) and modified phases can be used in the present invention for the first compound. The presence of a small amount of $H_2O$ (less than 10% by weight) is also possible.

Preferably, in formula (II):

$0.1 \leq x \leq 2$ $0.1 \leq y \leq 1.9$ $0.2 \leq x+y \leq 3.9$

More preferably, in formula (II):

$0.5 \leq x \leq 1.8$ $0.5 < y \leq 1.9$ $1 < x+y \leq 3.7$.

In a preferred compound of formula (II) x+y is at least 2.

Compounds of formula (II) preferably crystallize in the orthorhombic crystal system.

The second compounds of formula (II) useful in the present invention are described for example in US 2013/0216903, the disclosure of which is incorporated herein in its entirety.

The first component and said second component are present in amounts of 1:99% by weight to 99:1% by weight, based on the weight of the EAM. Preferably, the first component and said second component are present in amounts of 90:10% by weight to 70:30% by weight, based on the weight of the EAM. More preferably, the first component and said second component are present in amounts of 85:15% by weight to 80:20% by weight, based on the weight of the EAM.

Advantageously, the first compound is in the form of particles having a particle size comprised between 1 μm and 200 μm, preferably between 10 μm and 100 μm, and the second compound is in the form of nanoparticles having a particle size less than 500 nm, preferably comprised between 10 nm and 500 nm, and more preferably comprised between 20 nm and 100 nm, or in the form of nanofibers with a length comprised between 0.2 μm and 500 μm, preferably comprised between 100 μm and 300 μm, and a width comprised between 10 nm and 200 nm, preferably between 20 nm and 100 nm.

According to the present invention, the method for preparing an electro-active material as defined above comprises a step of preparing a first component comprising at least a first compound of formula (I) $Li_xMnO_y$, a step of preparing a second component comprising at least a second compound of formula (II) $Li_xH_yV_3O_8$, and a step of mixing said first and second components.

That means that the first component useful in the invention is prepared at least from the first compound of formula (I) and the second component useful in the present invention is prepared at least from the second compound of formula (II), separately from the first component.

Preferably, the step of preparing the first component comprises a step of providing a surface coating to the first compound and/or a step of mixing the first compound with at least an additional material selected from the group comprising conductive additive and binder.

Preferably, the step of preparing the second component comprises a step of providing a surface coating to the second compound and/or a step of mixing the second compound with at least an additional material selected from the group comprising conductive additive and binder.

Advantageously, the first and second components may be respectively treated with a surface coating or compositing process, e.g. carbon/graphite/graphene coating, polymer coating, or metal oxide, metal fluoride, metal poly-anion compound coating, etc.

The first and second components may be also respectively mixed with at least an additional material that can improve the physical, chemical stability or electrochemical performance. Advantageously, the additional material is selected from the group comprising conductive additive and binder.

A variety of carbonaceous materials may be used as conductive additives, e.g. graphite powder, carbon black, acetylene black, fibrous carbon, graphene, etc. Conductive polymer may be used as suitable conductive additives as well. The weight percentage of conductive additives (based on the weight of the first or second component) is less than 20%, preferably 1-10% with bulk carbonaceous materials such as graphite and carbon black powder, and 1-5% in weight with nano carbonaceous materials such as graphene and carbon nanotubes.

Suitable binder may be selected from fluorocarbon such as polyvinylidene fluoride (PVDF), tetrafluoroethylene (TFE), hexafluoropropylene polytetrafluoroethylene (PTFE), propylene hexafluoride vinylidene fluoride copolymer etc.; or cellulose contained compounds such as hydroxypropyl methylcellulose (HPMC), carboxymethyl cellulose (CMC), cellulose acetate etc.; or polyvinyl alcohol (PVA), polyolefin resin, stryrenebutadiene rubber, acrylonitrile-butadiene rubber, acrylonitrile-butadiene-styrene rubber, polyacrylic acid, poly(3,4-ethylenedioxythiophen (PEDOT) and blends of two or more thereof. These binders can be used as bulk, film or in form of nanoparticles, etc. preferably the size of nanoparticles in a range of <500 nm. The weight percentage is less than 15%, preferably less than 5%, based on the weight of the first or second component.

Once prepared, the first and second components are mixed to form the EAM of the invention.

A cathode can be prepared by tableted process with mechanical pressure, the EAM being pressed in the form of tablet to form the cathode.

The cathode can be also prepared by slurry-coating-dry process, which makes the EAM bounded on the current collectors and present stable electrochemical performance. In this embodiment, the cathode comprises a current collector coated with the EAM of the invention.

Such cathode may be used together with an anode and an electrolyte to manufacture a primary battery, said primary battery comprising:

a) a cathode as disclosed above,
(b) an anode, and
(c) a non-aqueous electrolyte between said electrodes.

Active anode materials can be selected as lithium metal or other metals such as Al, Si, B, Sn, Sb, Bi, Ag, Mg, Ca, K, Ti, Zn, In, Ge, Pb, Pd, Pt and two or more alloyed thereof; carbonaceous materials such as natural or artificial graphite, cokes, carbon fibres, carbon black etc.; metal oxides such as $SiO_x$, $SnO_x$, $FeO_x$, $WO_x$, $NbO_x$, $MoO_x$, $VO_x$, $Li_4Ti_5O_{12}$, $LiVO_2$, $CuO_x$, $SbO_x$, $CrO_x$, $MnO_x$, $CoO_x$, $ZnO_x$ etc.; metal nitride or oxynitrides such as, $VN_x$, $Li_3FeN_2$, $Li_{3-x}M_xN$ (M=Co, Ni, Cu), $Li_7MnN_4$, CoN, $Cr_{1-x}Fe_xN$, $Li_7MnN_4$, $Li_{7.9}MnN_{2.2}O_{1.6}$, $NbN_xO_y$, $VO_xN_y$, $MoO_xN_y$ etc. and metal chalcogenides such as $Ti_2S_3$, $TiS_2$, $TiS_x$, $V_3S_4$, $VS_2$, Vs, $VS_x$, $Fe_3S_4$, $FeS_2$, $FeS_x$, $Mo_2S_3$, $MoS_2$, $MoS_x$, $NbS_x$, $NbSe_x$, $SnS_2$, SnS, $SnS_x$, $Sb_2S_3$, $SbS_x$, $Se_5S_3$, $SeS_2$, SeS, $SeS_x$ etc. These anode materials can be used as bulk, or in form of nanoparticles, preferably nanoparticles in a range of <500 nm. And they may mix with other additives such as carbonaceous materials, conductive polymers, binders, etc.

Preferably, the anode is a lithium metal anode.

The suitable active anode materials can be prepared by tableted process with mechanical pressure or slurry-coating-dry process, which make the electrode materials bounded on the current collectors and present stable electrochemical performance.

The electrolyte is generally a material with high ionic conductivity and meanwhile is electronic insulator. It may be selected as liquid electrolyte containing solvents such as propylene carbonate (PC), 1,3-dioxolane (Diox), diethyl ether (DEE), 1,2-dimethyoxyethane (DME), dimethoxymethane (DMM), methyl acetate (MA), 2 methyl furan (2Me-F), 2 methyl tetrahydrofuran (2Me-THF), methyl formate (MF), tetrahydorfuran (THF), ethylene carbonate (EC), dimethyl carbonate (DMC), diethyl carbonate (DEC), dipropyl carbonate (DPC), and ethylmethyl carbonate (EMC), butylene carbonate, diglyme, triglyme, tetraglyme, γ-butyrolactone (5-membered ring), o-valerolactone (6-membered ring) and e-caprolactone (7-membered ring) and blends of two or more thereof. Typical mixtures are PC/DME, EC/DMC, EC/DEC, EC/DPC, EC/EMC etc. These solvents serve as a purpose of solvating the inorganic salts.

Typical inorganic salts are lithium contained salts such as $LiClO_4$, $LiBF_4$, $LiAlCl_4$, $LiPF_6$, $LiAsF_6$, $LiSbF_6$, $LiBMe_4$, $LiB(C_6H_5)_4$, LiBr, LiI, $LiCF_3SO_3$, $LiN(SO_2CF_3)_2$, $LiN(SO_2C_2F_3)_2$, $LiC(SO_2CF_3)_3$, $Li_2B_{10}Cl_{10}$ or mixed two or more thereof. At present the preferable salts are $LiClO_4$, $LiBF_4$, $LiPF_6$, $LiAsF_6$, $LiN(SO_2CF_3)_2$ and $LiC(SO_2CF_3)_3$.

The following examples illustrate the present invention without however limiting the scope.

EXAMPLES

1) Parameters

In order to describe the advantages of said blended EAM of manganese oxide and vanadium oxide of the invention compared to single one of the active materials, firstly manganese oxide and vanadium oxide were treated with sufficient conductive carbonaceous materials, which made them to approach the theoretical capacities as much as possible and thus to remove the influence of electronic conductive problem. Secondly four parameters were estimated and compared, in order to evaluate the performance of blended EAM of the invention. They are described as below:

Supposed the mixture is comprised of active manganese oxide component A comprising the compound of formula (I) including sufficient additives with $c_i$, weight percentage, and vanadium oxide component B comprising the compound of formula (II) including sufficient additives with $1-c_i$, weight percentage.

a) Synergic Effect of Pressed Density (SEPD), %;

By applying different mechanical pressures, supposed single component A gives a pressed density $d_A$ and B gives a pressed density $d_B$; the mixture of A and B gives actual density $d_M$, in total W grams of material is used. The theoretical density $d_T$ is calculated as:

$$d_T = W/(W^*c_i/d_A + W^*(1-c_i)/d_B) \quad (1)$$

Then the SEPD is obtained from:

$$SEPD = d_M/d_T = d_M/[W/(W^*c_i/d_A + W^*(1-c_i)/d_B)] = d_M^*[c_i/d_A + (1-c_i)/d_B]^*100\%; \quad (2)$$

When SEPD>100%, it means these two different particles diffuse with each other and produce a synergic effect between components A and B.

b) Synergic Effect of Specific Capacity (SESC), %;

By testing the materials in electrochemical cells, component A has specific capacity (mAh/g) $C_A$ and B has $C_B$, respectively. The mixture of A and B gives actual specific capacity $C_M$. The theoretical capacity is obtained from $C_T = c_i^*C_A + (1-c_i)^*C_B$. Thus the SESC is calculated as followed formula:

$$SESC = C_M/C_T = C_M/[c_i^*C_A + (1-c_i)^*C_B]^*100\%; \quad (3)$$

SESC>100% means the specific capacity (mAh/g) of blended active material has synergic effect from single components.

c) Volumetric Capacity (VC), Ah/L;

VC is used to evaluate the practical capacity of EAM. The VC changing of the blended EAM depends on the synergic effect of both pressed density and specific capacity from single components. It is calculated by the total capacity (C, mAh) divided by the volume of the electrode $cm^3$, namely:

$$VC = C/(h^*\pi^*d^2/4); \quad (4)$$

wherein h (cm) is the height and d (cm) is the diameter of electrode, respectively.

d) Volumetric Energy Density (VED), Wh/l;

VED is used to evaluate the practical energy density of EAM. The VED changing of the blended EAM depends on the synergic effect of both pressed density and specific capacity from single components. It also relates to the average work potential (V). It is calculated by the total energy density (E=C*V) divided by the volume of the electrode ($cm^3$), namely:

$$VED = E/(h^*\pi^*d^2/4); \quad (5)$$

wherein h (cm) is the height and d (cm) is the diameter of active electrode, respectively.

2) Examples of EAM a) Preparation of the First Component A

In these examples, the first component A is prepared from the first compound of formula (I) which is EMD $MnO_2$ having particle size in the range of 10-100 µm. Such EMD $MnO_2$ is available on the market. Firstly EMD $MnO_2$ was treated with PVA solution and mixed with graphite powder (7%), PTFE binders (3%). Then the mixture was heated in vacuum oven at 310° C. for 8 hours, cooled down by switching off the oven. The first component A is used for reference cathode and blending with vanadium oxide further.

b) Preparation of the Second Component B

The synthesis of $Li_xH_yV_3O_8$ used as second compound of formula (II) and of the composite of $Li_xH_yV_3O_8$ and Reduced Graphene Oxide (RGO) were described in example 1 of US 2013/0216903. The compound is characterized as $Li_{1.7}H_{0.6}V_3O_8$ with around 5% RGO. In all experiments the Li content was kept constant, namely x=1.7 and y=0.6. Then obtained composite was mechanically mixed with 2% graphite powder, and 3% carbon black (such materials are available on the market). The second component B is used for reference cathode and blending with manganese oxide further. The second compound is in the form of nanofibers with a length of about 200 µm and a width of about 100 nm.

c) Preparation of the EAM

The first component A of example a and the second component B of example b were mixed in a mortar manually for 15-20 minutes. A total weight of 0.4 gram was used, and different samples having a ratio between the first component A and the second component B which varied from 100/0 to 0/100 have been prepared. The samples are listed in Table 1 below.

TABLE 1 weights (g) and ratios of first (A) and second (B) components applied in different samples

| Nr. | 2.1 | 2.2 | 2.3 | 2.4 | 2.5 | 2.6 | 2.7 | 2.8 | 2.9 | 2.10 |
|---|---|---|---|---|---|---|---|---|---|---|
| A | 0.4 | 0.39 | 0.38 | 0.36 | 0.34 | 0.32 | 0.3 | 0.2 | 0.1 | 0 |
| B | 0 | 0.01 | 0.02 | 0.04 | 0.06 | 0.08 | 0.1 | 0.2 | 0.3 | 0.4 |
| Ratio A/B | 100/0 | 97.5/2.5 | 95/5 | 90/10 | 85/15 | 80/20 | 75/25 | 50/50 | 25/75 | 0/100 |

The pressed density and the SEPD of these samples were measured under different pressures:

The samples Nr. 2.1 to 2.10 were loaded in a die with diameter Ø 15.9 mm and pressed under different pressures, 20 KN to 70 KN. The height of the obtained tablets was measured and used to calculate the pressed density (g/cm³). According to the references of the first and second components A and B, single used, and the formula (2), the SEPD was estimated. The values are listed in Table 2.

TABLE 2 pressed density (g/cm³) and SEPD of samples 2.1 to 2.10 under different pressures

| Nr. | Pressures | 20 KN | 30 KN | 40 KN | 50 KN | 60 KN | 70 KN |
|---|---|---|---|---|---|---|---|
| 2.1 | Density | 2.62 | 2.74 | 2.96 | 3.06 | 3.17 | 3.22 |
| 2.2 | Density | 2.91 | 3.01 | 3.11 | 3.17 | 3.22 | 3.28 |
|  | SEPD | 113% | 112% | 107% | 105% | 104% | 104% |

TABLE 2-continued pressed density (g/cm³) and SEPD of samples
2.1 to 2.10 under different pressures

| Nr. | Pressures | 20 KN | 30 KN | 40 KN | 50 KN | 60 KN | 70 KN |
|---|---|---|---|---|---|---|---|
| 2.3 | Density | 2.82 | 2.96 | 3.01 | 3.11 | 3.11 | 3.17 |
|  | SEPD | 112% | 111% | 105% | 105% | 102% | 102% |
| 2.4 | Density | 2.69 | 2.82 | 2.91 | 3.01 | 3.06 | 3.11 |
|  | SEPD | 110% | 109% | 105% | 105% | 104% | 103% |
| 2.5 | Density | 2.65 | 2.78 | 2.91 | 2.96 | 3.01 | 3.06 |
|  | SEPD | 112% | 111% | 108% | 107% | 105% | 105% |
| 2.6 | Density | 2.51 | 2.62 | 2.78 | 2.91 | 2.96 | 3.01 |
|  | SEPD | 109% | 107% | 106% | 108% | 107% | 106% |
| 2.7 | Density | 2.51 | 2.62 | 2.74 | 2.82 | 2.91 | 2.96 |
|  | SEPD | 113% | 110% | 108% | 108% | 108% | 107% |
| 2.8 | Density | 2.01 | 2.10 | 2.23 | 2.41 | 2.51 | 2.62 |
|  | SEPD | 104% | 100% | 100% | 106% | 108% | 109% |
| 2.9 | Density | 1.75 | 1.90 | 2.01 | 2.10 | 2.12 | 2.12 |
|  | SEPD | 103% | 101% | 101% | 104% | 103% | 99% |
| 2.10 | Height (mm) | 1.18 | 1.06 | 1.01 | 1 | 0.98 | 0.94 |
|  | Density | 1.53 | 1.70 | 1.79 | 1.81 | 1.84 | 1.92 |

The results of Table 2 show that SEPD values were surprisingly found larger than 100%. It means that there is an unexpected synergic effect of pressed density of components A and B. Table 2 shows also that the pressed density has stronger synergic effect as lower pressure applied. The strongest SEPD can reach over 110%, which would result in over 10% more volumetric capacity than the sum of two components.

3) Examples of Electrochemical Cells a) Preparation and Testing

CR2016 type coin cells were used for the electrochemical testing set-up, excess lithium metal was used for anode, and the tablets prepared from different blended active materials of first component A and second component B as prepared according to example 2 were tested as cathodes. The same pressure, 70 KN, was applied to press the cathode tablets. The diameter of cathode tablet is Ø 15.9 mm and the thickness is about 0.5 mm.

Between anode and cathode, polypropylene was used for separator and absorb electrolyte. The electrolyte, 1 M LiPF6 in EC/DMC (1:1 vol. %) was used in all of electrochemical cells.

The cells were firstly charged till 4 volts in order to exact some of Li ions from $Li_{1.7}H_{0.6}V_3O_8$, and then discharged till 2. The constant current was set as 0.1 mA/cm².

b) Electrochemical Performance of a First Series of Cathodes

A first series of cathode tablets with the ratios between component A and component B as obtained in Example 2 varying from 100/0, 75/25, 50/50, 25/75 to 0/100 were investigated. Suitable weight of cathode was used to reach the similar thickness. Stainless steel mesh was pressed in the tablets to stabilize the electronic contact. The applied pressure was 70 KN. The parameters of these cathode tablets are listed in table 3.

TABLE 3

Different tablets pressed from component A and component B

| | Nr. | | | | |
|---|---|---|---|---|---|
| | 3.1 | 3.2 | 3.3 | 3.4 | 3.5 |
| A | 0.3 g | 0.195 g | 0.12 g | 0.055 g | 0 g |
| B | 0 g | 0.065 g | 0.12 g | 0.165 g | 0.2 g |
| Ratio A/B | 100/0 | 75/25 | 50/50 | 25/75 | 0/100 |

TABLE 3-continued

Different tablets pressed from component A and component B

| | Nr. | | | | |
|---|---|---|---|---|---|
| | 3.1 | 3.2 | 3.3 | 3.4 | 3.5 |
| Thickness (mm) | 0.55 | 0.49 | 0.50 | 0.49 | 0.51 |

The electrochemical tests of different cathode tablets were performed by using the set-up and methods described in example 3a. The results show the different electrochemical behaviours from different cells. In order to evaluate the performance of the blended cathode materials, specific capacity (mAh/g), SESC (%), volumetric capacity (Ah/l), volumetric energy density (Wh/l) were calculated accordingly for a discharge to 2V and shown in Table 4.

TABLE 4 first discharge performance of different blended cathode
materials for a discharge to 2 V

| | Nr. | | | | |
|---|---|---|---|---|---|
| | 3.1 | 3.2 | 3.3 | 3.4 | 3.5 |
| Specific Capacity (mAh/g) | 171.3 | 206.9 | 222.5 | 238.3 | 260.5 |
| SESC (%) | 100 | 107 | 103 | 100 | 100 |
| Volumetric Capacity (Ah/l) | 470.9 | 553.3 | 538.2 | 539.2 | 514.8 |
| Volumetric Energy Density (Wh/l) | 1281 | 1519 | 1494 | 1518 | 1464 |

When the cells were discharged to 2 volts, pure component B shows higher specific capacity and volumetric capacity than pure component A. Although the blended materials do not give higher specific capacity than component B, surprisingly the volumetric capacities of the blended materials of the invention exhibit higher values than both of component B and component A, used alone. Although component B in the form of nanosized particles, has in general better specific capacity in batteries than bulk materials, it is still a challenge to improve the volumetric capacity due to their low pressed density. One of the factors that improve the volumetric capacity is from the synergetic effect of pressed density as discussed in example 2; another factor is contributed to the synergic effect of specific capacity (value of SESC higher than 100%).

The blended materials of the invention with 25% of second component B exhibit the strongest synergic effect SESC as high as 107% and has the highest volumetric energy density compared to single components and other blended materials.

In the commercial CR type of Li batteries, normally 2.0 V is used as cutting voltage. When the blended materials of the invention were discharged to 2 V, the addition of the second component based on $Li_{1.7}H_{0.6}V_3O_8$ significantly improves the volumetric capacity and energy density of $MnO_2$ cathode. Due to the synergic effects from pressed density and specific capacity, the blended cathode of the invention showed the improvement on the second component based on $Li_{1.7}H_{0.6}V_3O_8$ used alone.

c) Electrochemical Performance of a Second Series of Cathodes

In order to optimize the ratio of blended materials further, a second series of cathode tablets was investigated with ratios between first component A and second component B varying from 100/0, 95/5, 90/10, 85/15, to 80/20. The same total weight, 0.28 g, of mixture was used in this case. Stainless steel mesh was pressed in the tablets to stabilize the electronic contact. The applied pressure was 70 KN. The parameters of these cathode tablets are listed in Table 5.

TABLE 5 different tablets pressed from component A and component B

| | Nr. | | | | |
|---|---|---|---|---|---|
| | 4.1 | 4.2 | 4.3 | 4.4 | 4.5 |
| A | 0.28 g | 0.266 g | 0.252 g | 0.238 g | 0.224 g |
| B | 0 g | 0.014 g | 0.028 g | 0.042 g | 0.056 g |
| Ratio A/B | 100/0 | 95/5 | 90/10 | 85/15 | 80/20 |
| Thickness (mm) | 0.50 | 0.49 | 0.50 | 0.51 | 0.51 |

The electrochemical tests of different cathode tablets were performed by using the set-up and methods described in example 3a. Table 6 lists the values of specific capacity, SESC, volumetric capacity, and volumetric energy density of blended cathode tablets for a discharge to 2 V. The reference values of cathode tablet Nr. 3.5 comprising single component B based on $Li_{1.7}H_{0.6}V_3O_8$ are taken to calculate the SESC of this series of blended cathodes.

TABLE 6 first discharge performance of different blended cathode materials for a discharge to 2 V

| | Nr. | | | | |
|---|---|---|---|---|---|
| | 4.1 | 4.2 | 4.3 | 4.4 | 4.5 |
| Specific Capacity (mAh/g) | 167.5 | 192.1 | 190.4 | 202.5 | 204.3 |
| SESC (%) | 100 | 112 | 108 | 112 | 110 |
| Volumetric Capacity (Ah/l) | 472.6 | 553.3 | 537.1 | 560.2 | 565.1 |
| Volumetric Energy Density (Wh/l) | 1286 | 1512 | 1458 | 1539 | 1548 |

Similarly with the samples in example 3b, the blended cathodes of the invention show the synergic effect of specific capacity. Table 6 shows that SESC stabilizes around 110% in the range of 5%-20% of second component B.

The blended cathodes of the invention exhibit the enhancement on volumetric capacity and energy density compared to both of single component A based on $MnO_2$ and single component B based on $Li_{1.7}H_{0.6}V_3O_8$. Voltage dependence of volumetric capacity is plotted in FIG. 1. It shows that, in this series of experiments, the materials with 15% and 20% of component B have the best performance compared to the single components and other blended cathodes. It is also worthy noticed that the discharge potential plateau of component B based on $Li_{1.7}H_{0.6}V_3O_8$ is 0.1 V lower than component A based on $MnO_2$, the blended materials exhibit lower potential at the beginning of plateau, and then slowly transfer and stabilize at the same potential as pure component A based on $MnO_2$. This intermediate stage could probably indicate a charge transfer process between redox couples $V^{4+}/V^{3+}$ and $Mn^{4+}/Mn^{3+}$.

The blended cathodes of $MnO_2$ and $Li_xH_yV_3O_8$ of the invention described above have enhanced volumetric capacity and energy density compared to the single components. This is a big advantage that they can improve the capacity and energy density of lithium batteries.

While there are shown and described presently preferred embodiments of the invention, it is to be distinctly understood that the invention is not limited thereto but may be otherwise variously embodied and practiced within the scope of the following claims.

What is claimed is:

1. An electro-active material comprising a mixture of a first component comprising at least a first compound of formula (I) $Li_xMnO_y$, and a second component comprising at least a second compound of formula (II) $Li_xH_yV_3O_8$, wherein in formula (I):

$0 \leq x \leq 2$ $1 \leq y \leq 3$ $2 < 2y-x < 5$, wherein in formula (II):

$0 \leq x \leq 4.5$ $0.01 \leq y \leq 2$ $0.01 \leq x+y \leq 6.5$, wherein the first compound is in the form of particles having a particle size comprised between 1 μm and 200 μm, and the second compound is in the form of nanoparticles having a particle size less than 500 nm or in the form of nanofibers with a length comprised between 0.2 μm and 500 μm, and a width comprised between 10 nm and 200 nm, wherein said first component and said second component are present in amounts of 1:99% by weight to 99:1% by weight, and.

wherein the mixture, upon being mechanically pressed in a range of 20 to 70 KN with a die, has a synergic effect of pressed density (SEPD) greater than 100%.

2. The electro-active material according to claim 1, wherein the first compound is in the form of particles having a particle size comprised between 10 μm and 100 μm.

3. The electro-active material according to claim 1, wherein the second compound is in the form of nanoparticles having a particle size comprised between 10 nm and 500 nm.

4. The electro-active material according to claim 3, wherein the second compound is in the form of nanoparticles having a particle size comprised between 20 nm and 100 nm.

5. The electro-active material according to claim 1, wherein the second compound is in the form of nanofibers with a length comprised between 100 μm and 300 μm.

6. The electro-active material according to claim 1, wherein the second compound is in the form of nanofibers with a width comprised between 20 nm and 100 nm.

7. The electro-active material according to claim 1, wherein, in formula (I) x is 0 and y is 2.

8. The electro-active material according to claim 1, wherein, in formula (II):

$0.1 \leq x \leq 2$ $0.1 \leq y \leq 1.9$ $0.2 \leq x+y \leq 3.9$.

9. The electro-active material according to claim 8, wherein, in formula (II):

$0.5 \leq x \leq 1.8$ $0.5 < y \leq 1.9$ $1 < x+y \leq 3.7$.

10. A method for preparing the electro-active material of claim 1, the method comprising mixing said first and second components.

11. The method according to claim 10, wherein the first component is surfaced-coated and/or present in a mixture with at least one additional material selected from the group consisting of a conductive additive and a binder.

12. The method according to claim 10, wherein the second component is surface-coated and/or present in a mixture with at least one additional material selected from the group consisting of a conductive additive and a binder.

13. A cathode comprising the electro-active material of claim 1.

14. A cathode comprising a current collector coated with the electro-active material of claim 1.

15. A primary lithium battery comprising:
(a) a cathode comprising the electro-active material of claim 1,
(b) an anode, and
(c) a non-aqueous electrolyte between said electrodes.

16. The primary lithium battery according to claim 15, wherein said anode is a lithium metal anode.

17. The electro-active material of claim 1, wherein the mixture has a synergic effect of specific capacity (SESC) greater than 100%.

18. The electro-active material of claim 17, wherein the SESC is in a range of greater than 100 to less than or equal to 112%.

19. The electro-active material of claim 1, wherein the SEPD is in a range of greater than 100 to less than or equal to 113%.

* * * * *